Patented Mar. 24, 1925.

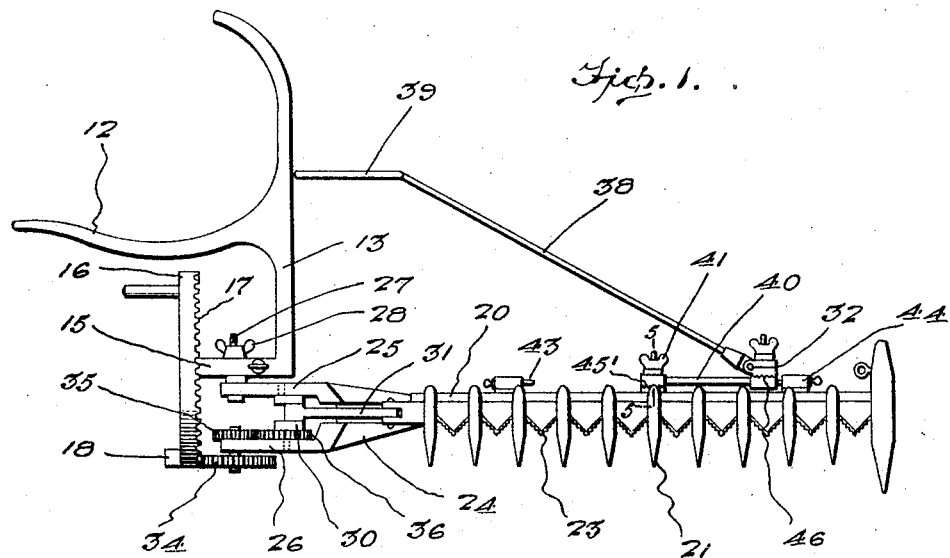
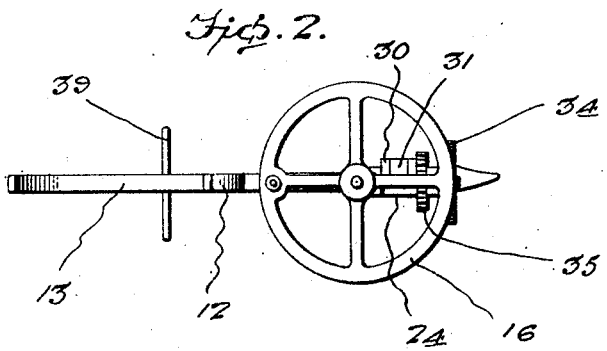
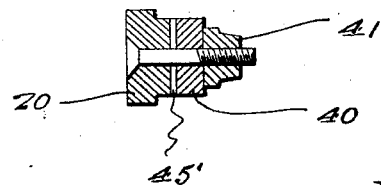

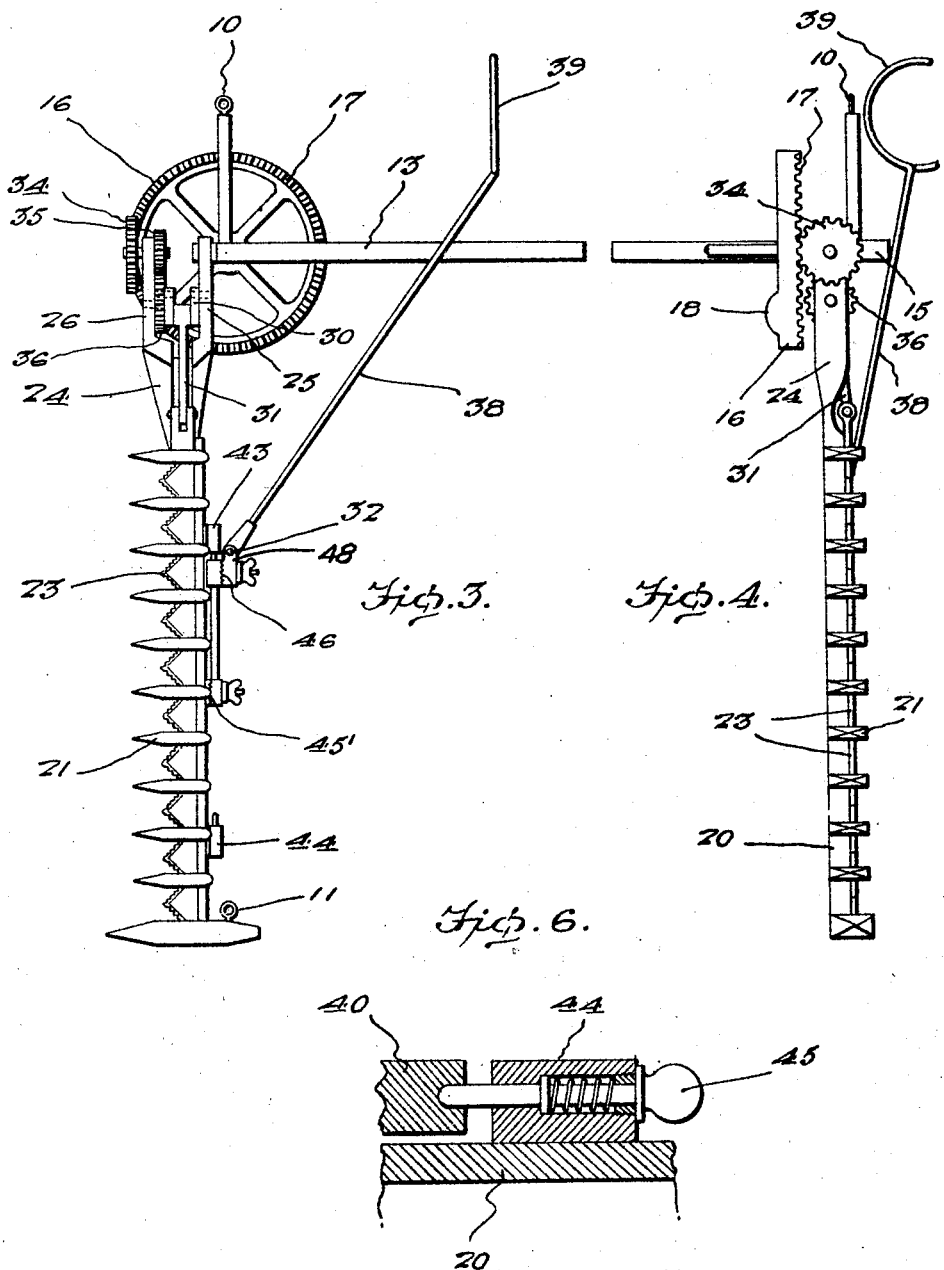

1,530,571

UNITED STATES PATENT OFFICE.

JOSEPH LEROY MORROW, OF PIGGOTT, ARKANSAS.

HEDGE-TRIMMING DEVICE.

Application filed August 2, 1922. Serial No. 579,187.

*To all whom it may concern:*

Be it known that I, JOSEPH LEROY MORROW, a citizen of the United States, residing at Piggott, in the county of Clay and State of Arkansas, have invented new and useful Improvements in Hedge-Trimming Devices, of which the following is a specification.

The object of this invention is to provide particular supporting and driving mechanism, and a cutter bar and mounting means therefor, adjustable with reference to the supporting and driving mechanism, for the purpose of permitting of the use of the device in a horizontal position or in a vertical position.

A further object is to provide supporting means to be retained in a given position, a main drive wheel mounted on said means, and connections between a cutter bar and the main drive wheel, which will permit of operating the cutter in a position for trimming the top of the hedge, and also in a position for trimming the sides thereof.

A still further object is to make special provision for steadying the cutter bar, in either the horizontal or vertical position.

With the foregoing and other objects in view, the invention consists in the novel construction and arrangement of elements described, illustrated, and claimed, it being understood that modifications may be made within the scope of the claims without departing from the spirit of the invention.

In the drawings, Figure 1 is a top plan view of the device; Figure 2 is a view looking from the left in Figure 1; Figure 3 is a side elevation, the cutter bar having been dropped from the horizontal position of Figure 1 to a vertical position; Figure 4 is a view from the left in Figure 3; Figure 5 is a section on line 5—5 of Figure 1; Figure 6 is a detail view, chiefly in section, showing one of the latches for holding bar 40 of Figure 1.

An element termed a body brace is intended to be retained against the body of the user of the device, and to be supported by straps or the like, termed a harness. These straps may be connected at the points designated 10 and 11, the body brace including the curved portion 12, the straight portion 13, and the offset portion 15.

The main drive wheel 16 is rotatably mounted on elements 15 and is provided with a series of teeth 17, on the side thereof, this wheel imparting motion to the gearing by means of which the cutter bar is reciprocated. The wheel 15 is provided with a weighted portion 18, in order that the wheel may be properly balanced.

The stationary element of the cutting mechanism is designated 20, and is provided with teeth 21, the reciprocable cutter bar 22 having teeth 23, of the form shown.

Carried by one end of the element 20, or formed therewith is a head including the central portion 24, formed as shown, and the side elements 25 and 26, the former receiving the bolt 27 by means of which the cutting mechanism is mounted on the element 15. This bolt is provided with a thumb nut 26, and by loosening this nut, the angle of the cutting mechanism with reference to the supporting structure may be changed, so that the device may be easily used either for trimming the top or the sides of the hedge.

The crank element, or crank shaft 30 imparts movement to the reciprocable cutter bar through the pitman 31. A gear wheel 33 is mounted on a stub shaft 34 carrying also a gear wheel or pinion 35 meshing with a gear wheel 36 on the crank shaft. Movement imparted to the drive wheel 16 is therefore transmitted to the cutter bar, and the drive is the same regardless of the position of the cutter bar with reference to the main supporting means.

An arm brace 38 has a ring member 39 at the outer end thereof, and is connected by the means shown with the short bar 40, the latter in turn being connected with the element 20 by means of thumb screw 41. Pivotal connection is provided at 32 between the end of the arm brace and the element 48 adjustably connected with the short bar just referred to. Non-rotatable connections are however provided at the points 45' and 46 by providing the toothed surfaces shown.

Spring held latches, shown in detail in Figure 6, are mounted on element 20, and hold bar 40 in either position in which it is employed, the latches being designated 43 and 44.

What is claimed is:

1. In a device of the class described, a main support, an element including a forked end, means for connecting the forked end with the main support and permitting adjustment at various angles with reference thereto, a cutter bar mounted on the element having the forked end, an auxiliary support connected with this element, and driving means connected with the forked end, for imparting movement to the cutter bar.

2. In a device of the class described, a main support, cutting mechanism mounted thereon and movable about a horizontal axis, driving mechanism connected with the cutting mechanism, said cutting mechanism including a reciprocable element and a relatively stationary element, a bar mounted on the stationary element and pivoted thereto at one end, and a brace pivoted to the opposite end of the bar and movable to a plurality of positions with reference to the stationary element, incident to swinging movement of the bar about its pivot.

In testimony whereof I affix my signature.

JOSEPH LEROY MORROW.